United States Patent
Kunz

(10) Patent No.: US 7,883,059 B2
(45) Date of Patent: Feb. 8, 2011

(54) ACTUATOR SYSTEMS AND ASSOCIATED METHODS FOR UNMANNED AIR VEHICLES AND OTHER APPLICATIONS

(75) Inventor: Peter Kunz, Hood River, OR (US)

(73) Assignee: Insitu, Inc., Bingen, WA (US)

( * ) Notice: Subject to any disclaimer, the term of this patent is extended or adjusted under 35 U.S.C. 154(b) by 936 days.

(21) Appl. No.: 11/750,133

(22) Filed: May 17, 2007

(65) Prior Publication Data

US 2009/0212167 A1 Aug. 27, 2009

(51) Int. Cl.
G05D 1/08 (2006.01)
B64C 13/16 (2006.01)

(52) U.S. Cl. .............. 244/178; 244/195; 244/99.4; 244/99.9; 318/560; 318/564

(58) Field of Classification Search .......... 244/99.2, 244/99.3, 99.4, 99.9, 178, 194, 195; 318/560–566, 318/615, 685; 74/88, 89, 89.26, 89.27; 701/3, 701/4, 8

See application file for complete search history.

(56) References Cited

U.S. PATENT DOCUMENTS

| | | | |
|---|---|---|---|
| 1,990,990 A | 2/1935 | Hathorn | |
| 2,315,110 A | 3/1943 | Dornier | |
| 3,309,588 A | 3/1967 | Martin et al. | |
| 3,950,686 A * | 4/1976 | Randall | 318/564 |
| 4,078,750 A | 3/1978 | Tomlinson | |
| 4,103,848 A | 8/1978 | Johnson, Jr. et al. | |
| 5,492,024 A | 2/1996 | Siner | |
| 5,762,439 A | 6/1998 | Siner | |
| 5,806,805 A * | 9/1998 | Elbert et al. | 244/195 |
| 5,913,492 A | 6/1999 | Durandeau et al. | |
| 6,056,327 A | 5/2000 | Bouldin et al. | |
| 6,142,413 A | 11/2000 | Dequin et al. | |
| 6,257,529 B1 * | 7/2001 | Kubo et al. | 244/221 |
| 6,579,031 B2 | 6/2003 | Bien | |
| 6,685,138 B1 * | 2/2004 | Krantz | 244/99.5 |
| 6,923,405 B2 * | 8/2005 | Cline et al. | 244/99.4 |
| 7,021,587 B1 * | 4/2006 | Younkin | 244/178 |
| 7,182,297 B2 | 2/2007 | Jackson | |
| 7,229,046 B2 | 6/2007 | DuRant | |
| 7,284,457 B2 | 10/2007 | Jinno et al. | |

(Continued)

OTHER PUBLICATIONS

U.S. Appl. No. 12/406,908, filed Mar. 19, 2009, Jackson.

(Continued)

*Primary Examiner*—Joshua J Michener
(74) *Attorney, Agent, or Firm*—Perkins Coie LLP

(57) ABSTRACT

Actuator systems and associated methods are disclosed herein. One aspect of the disclosure is directed toward an actuator system that includes a first structure and a second structure movable relative to the first structure. The system further includes an actuator apparatus and an actuator device coupled in series between the first structure and the second structure. The system can still further include a controller operably coupled to the actuator apparatus and the actuator device. The controller can be programmed with instructions to automatically actuate the actuator apparatus and the actuator device so that a position of the first structure relative to the second structure after the actuator apparatus and the actuator device have been actuated is at least approximately the same as a position of the first structure relative to the second structure before the actuator apparatus and the actuator device have been actuated.

35 Claims, 5 Drawing Sheets

U.S. PATENT DOCUMENTS 7,600,715 B2 * 10/2009 Matsui ................. 244/99.6

OTHER PUBLICATIONS

"10 mm (0.39") sized wingservos," http://www.volz-servos.com/english/servos/wingmazz_eng.html accessed Dec. 30, 2002, 4 pages.

"Mini-Star 3," http://www.volz-servos.com/english/servos/micstar_eng.html, accessed Dec. 30, 2002, 7 pages.

"Mini-Star 3," http://www.volz-servos.com/english/servos/minista_eng.html, accessed Dec. 30, 2002, 2 pages.

"Mounting Instructions for Wing-Star / Wing Maxx," http://www.volz-servos.com/english/mouninst.html, accessed Dec. 30, 2002, 2 pages.

* cited by examiner

ACTUATOR SYSTEMS AND ASSOCIATED METHODS FOR UNMANNED AIR VEHICLES AND OTHER APPLICATIONS

TECHNICAL FIELD

Embodiments of the present disclosure relate to actuator systems and associated methods, including actuator systems and methods for unmanned air vehicles and other applications.

BACKGROUND

Aircraft and other vehicles often use actuators to move various vehicle elements. For example, FIG. 1 is a partially schematic illustration of an aircraft wing 151 and an aileron 152 in accordance with the prior art. In FIG. 1, a first actuator 110 and a second actuator 120 are coupled between the wing 151 and the aileron 152 to move the aileron 152 relative to the wing 151. The first and second actuators 110, 120 are coupled between the wing 151 and the aileron 152 in a parallel configuration. In the parallel configuration, the first and second actuators 110, 120 are each coupled independently between the wing 151 and aileron 152. The parallel configuration is often used to provide an increase in the available force to move the aileron 152. For example, the parallel configuration is often used to provide the required force to deflect a control surface on an aircraft against high aerodynamic forces resulting from high-speed flight.

Additionally, the use of two actuators 110, 120 can provide redundancy in case one of the actuators fails. For example, the actuators 110, 120 often have a bypass mode that allows a failed actuator to move freely when the operative actuator applies a force to move the aileron 152. However, if the failed actuator fails in a manner such that it resists movement (e.g., becomes jammed), the operative actuator must apply a force to overcome any resistance presented by the failed actuator in order to move the aileron 152.

Actuators can also be coupled in series between vehicle elements. Typically, actuators are coupled in series between elements to perform different functions or to provide a larger range of motion than can be obtained with a single actuator. For example, some model aircraft have a low rate actuator and a high rate actuator connected in series between the model aircraft fuselage and the model aircraft elevator. The low rate actuator is used to position the elevator to provide pitch trim and the high rate actuator is used to position the elevator to provide dynamic pitch control.

DETAILED DESCRIPTION

Figure 1:
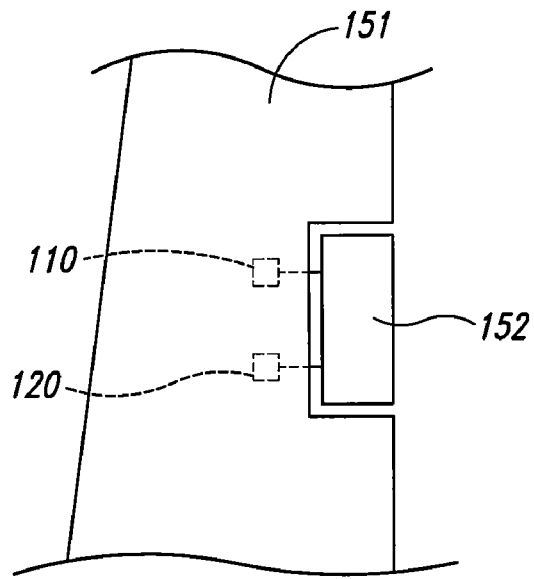
FIG. 1 is a partially schematic illustration of an aircraft wing and an aileron in accordance with the prior art.

The present disclosure is directed generally toward actuator systems and associated methods, including actuator systems and methods for unmanned air vehicles and other applications. One aspect of the disclosure is directed toward an actuator system that includes a first structure and a second structure movable relative to the first structure. The system can further include an actuator apparatus having a first portion and a second portion movable relative to the first portion when the actuator apparatus is actuated. The system can still further include an actuator device having a first portion and a second portion movable relative to the first portion when the actuator device is actuated. The actuator apparatus and the actuator device (which may be similar in some embodiments and different in others) can be coupled in series between the first structure and the second structure. The system can yet further include a controller operably coupled to the actuator apparatus and the actuator device. The controller can be programmed with instructions to automatically actuate the actuator apparatus and the actuator device so that a position of the first structure relative to the second structure after the actuator apparatus and the actuator device have been actuated is at least approximately the same as a position of the first structure relative to the second structure before the actuator apparatus and the actuator device have been actuated.

In further aspects, the system can include an electro-mechanical sensor having a sensor position corresponding to a relative position between the first and second portions of the actuator apparatus and/or a relative position between the first and second portion of the actuator device. The sensor position can be different after the actuator apparatus and the actuator device have been actuated as compared to before the actuator apparatus and the actuator device have been actuated. In still further aspects, the controller can be programmed with instructions to automatically actuate the actuator apparatus and the actuator device periodically at a selected time interval. In certain embodiments, some of these features can allow an electro-mechanical sensor to be repositioned periodically to reduce wear and tear on a specific portion of the sensor while allowing the first and second structures to remain in at least approximately the same relative position.

Another aspect of the disclosure is directed toward a method for positioning an actuator system that includes automatically sending one or more inputs from a controller to an actuator apparatus and an actuator device. The one or more inputs can command the actuation of the actuator apparatus and the actuator device. The controller can include at least a portion of a computing system. The method can further include actuating an actuator apparatus to move a first portion of the actuator apparatus relative to a second portion of the actuator apparatus in response to the one or more inputs. The method can still further include actuating an actuator device to move a first portion of the actuator device relative to a second portion of the actuator device in response to the one or more inputs. The actuator apparatus and the actuator device can be coupled in series between a first structure and a second structure. The position of the first structure relative to the second structure after the actuator apparatus and the actuator device have been actuated can be at least approximately the same as a position of the first structure relative to the second structure before the actuator apparatus and the actuator device are actuated.

In further aspects, the method can include sensing a sensor position of an electro-mechanical sensor. The sensor position can correspond to a relative position between a first portion and a second portion of an actuator apparatus and/or a relative position between a first portion and a second portion of an actuator device. The sensor position can be different after the actuator apparatus and the actuator device have been actuated as compared to before the actuator apparatus and the actuator device are actuated. In still further aspects, the method can include automatically sending one or more inputs from a controller to an actuator apparatus periodically at a selected time interval. In certain embodiments, some of these features can allow an electro-mechanical sensor to be repositioned periodically to reduce wear and tear on a specific portion of the sensor while allowing the first and second structures to remain in at least approximately the same position.

The present disclosure describes actuator systems and associated methods, including systems having an actuator apparatus and an actuator device coupled together in series. Several specific details of the disclosure are set forth in the following description and in FIGS. 1-10 to provide a thorough understanding of certain embodiments of the disclosure. One skilled in the art, however, will understand that the present disclosure may have additional embodiments, and that other embodiments of the disclosure may be practiced without several of the specific features described below.

Figure 2:
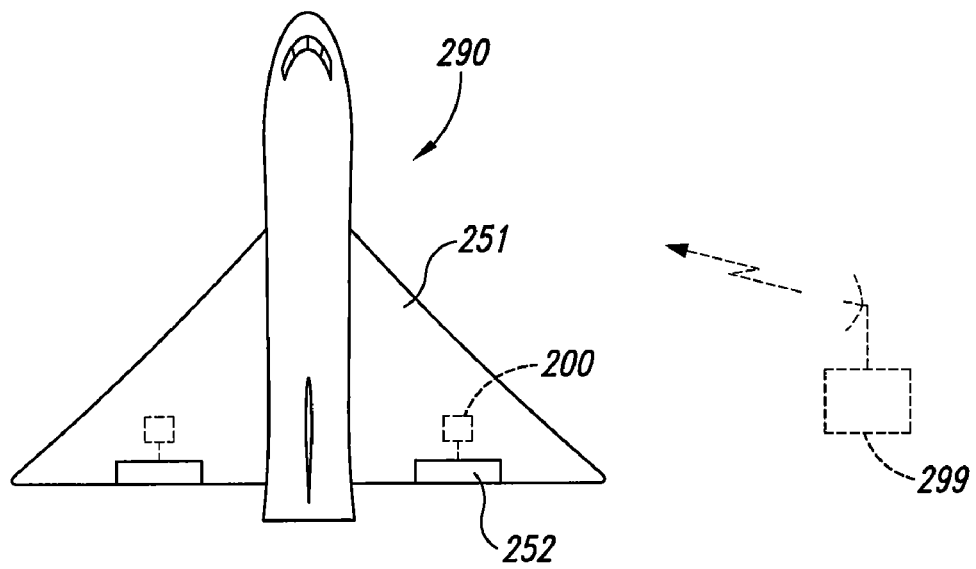
FIG. 2 is a partially schematic illustration of a vehicle having an actuator system in accordance with embodiments of the disclosure.

FIG. 2 is a partially schematic illustration of a vehicle 290 having an actuator system 200 in accordance with embodiments of the disclosure. In FIG. 2, the actuator system 200 is coupled between a first structure 251 (e.g., a wing) and a second structure 252 (e.g., an elevon for controlling pitch and roll). As discussed below in further detail, the actuator system 200 includes an actuator apparatus and actuator device operably coupled in series between the first structure 251 and the second structure 252. In the illustrated embodiment, the actuator apparatus and the actuator device are configured and positioned to provide redundancy in the event that one or the other fails or becomes jammed. Additionally, in FIG. 2 the actuator system 200 is configured so that the actuator apparatus and actuator device can change positions while maintaining the first and second structures 251, 252 in at least approximately a selected position. As discussed above, in certain embodiments, this feature can allow portions of the actuator system to be repositioned periodically to reduce wear on one or more sensors associated with the actuator system 200.

In the illustrated embodiment, the vehicle 290 includes an aerospace vehicle (e.g., a manned or unmanned aerospace vehicle). In other embodiments, the vehicle can include other types of vehicles including a ship, automotive type vehicle, and/or a piece of heavy equipment. In still other embodiments, multiple actuator systems can be installed on the same vehicle 290 and/or coupled between the same two structures.

Figure 3:
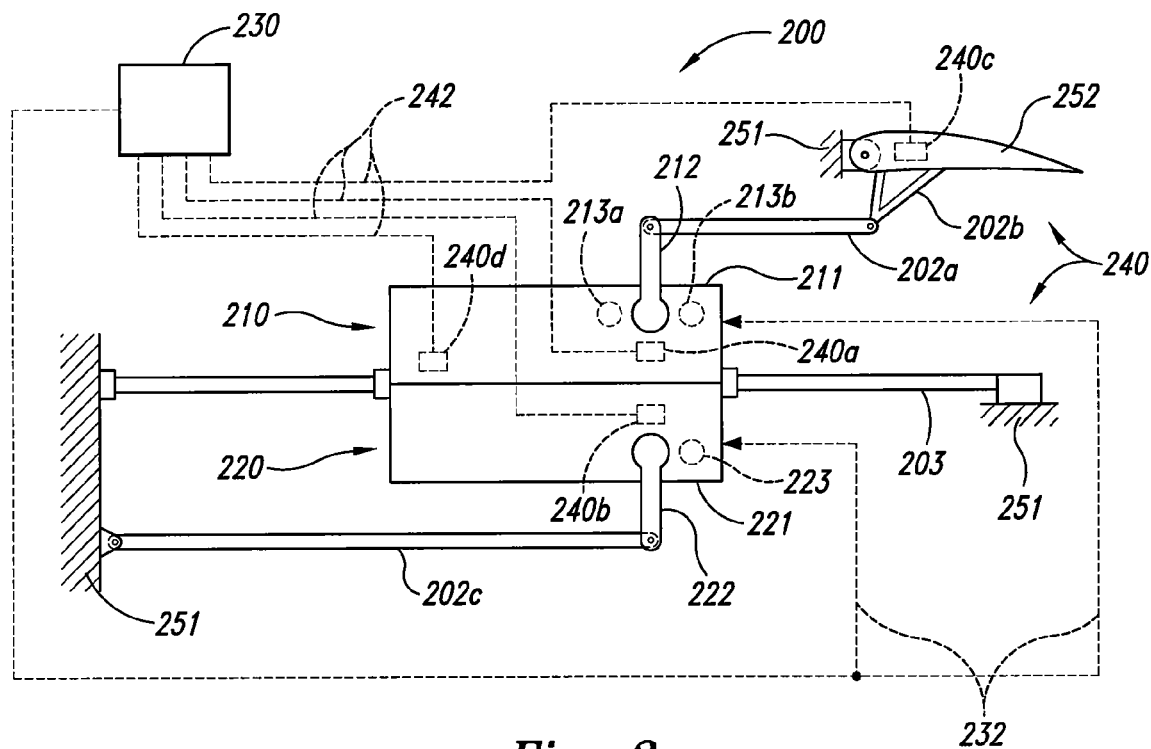
FIG. 3 is a partially schematic illustration of the actuator system shown in FIG. 2 with an actuator apparatus in a first apparatus position and an actuator device in a first device position in accordance with selected embodiments of the disclosure.

FIG. 3 is a partially systematic illustration of the actuator system 200 with the actuator apparatus 210 in a first apparatus position and the actuator device 220 in a first device position in accordance with selected embodiments of the disclosure. In FIG. 3, the actuator apparatus 210 is coupled to the actuator device 220 so that the actuator apparatus 210 and the actuator device 220 can slide along a support 203 or guide rail. The support 203 is coupled to portions of the first structure 251. In the illustrated embodiment, the second structure 252 is also coupled to a portion of the first structure 251 so that the second structure 252 is movable relative to the first structure 251 among at least a first structure position, a second structure position, and a third structure position (e.g., movable among three different positions). In FIG. 3, the first and second structure 251, 252 are shown in the first structure position.

In FIG. 3, the actuator apparatus 210 includes a first portion 211 and a second portion 212 movable relative to one another between at least a first apparatus position and a second apparatus position (e.g., different from the first apparatus position) when the actuator apparatus 210 is actuated. In the illustrated embodiment, the actuator apparatus 210 is shown in the first apparatus position. In FIG. 3, the actuator apparatus 210 includes a first actuator 213a and a second actuator 213b. The first and second actuators 213a, 213b of the actuator apparatus 210 are positioned to move the first portion 211 of the actuator apparatus 210 relative to the second portion 212 of the actuator apparatus 210.

In the illustrated embodiment, the actuators can include various types of actuators, including mechanically, hydraulically, pneumatically, and/or electrically operated actuators. In other embodiments, the actuator apparatus 210 can have other configurations, including more, fewer, and/or differently placed actuators. For example, although in the illustrated embodiment, the actuators are shown being carried by the first portion 211 of the actuator apparatus 210, in other embodiments one or more of the actuators can be carried by the second portion 212 of the actuator apparatus 210.

In FIG. 3, the actuator device 220 includes a first portion 221 and a second portion 222 movable relative to one another between at least a first device position and a second device position (e.g., different from the first device position) when the actuator device 220 is actuated. In the illustrated embodiment, the actuator device 220 is shown in the first device position. In FIG. 3, the actuator device 220 includes an actuator 223. The actuator 223 of the actuator device 220 is positioned to move the first portion 211 of the actuator apparatus 210 relative to the second portion 212 of the actuator apparatus 210. In the illustrated embodiment, the actuator 223 can include various types of actuators, including mechanically, hydraulically, pneumatically, and/or electrically operated actuators. In other embodiments, the actuator device 220 can have other configurations, including more, fewer, and/or differently placed actuators.

In the illustrated embodiment, the actuator apparatus 210 and the actor device 220 are coupled in series between the first structure 251 and the second structure 252. More particularly, in FIG. 3 the second portion 212 of the actuator apparatus 210 is coupled to the second structure 252 via a first link 202a and a second link 202b, and the second portion 222 of the actuator device 220 is coupled to (e.g., anchored to) the first structure 251 via a third link 202c. Additionally, the first portion 211 of the actuator apparatus 210 is coupled to the first portion 221 of the actuator device 220 so that the actuator apparatus 210 and the actuator device 220 can slide together (e.g., slide as a unit) along the support 203.

Accordingly, in FIG. 3 relative motion between the first and second portions 211, 212 of the actuator apparatus 210 will cause relative movement between the first structure 251 and the second structure 252 when the actuator device 220 remains in the first device position. Additionally, when the actuator apparatus 210 remains in the first apparatus position, relative motion between the first and second portions 221, 222 of the actuator device 220 will cause relative movement between the first structure 251 and the second structure 252 as the actuator device 220 and the actuator device 210 translate along the support 203. Furthermore, relative motion between the first and second portions 211, 212 of the actuator apparatus 210 in conjunction with relative motion between the first and second portions 221, 222 of the actuator device to 210 can cause relative movement between the first and second structures 251, 252 or allow the actuator apparatus 210 and the actuator device 220 to translate along the support 203 while the first and second structures 251, 250 remain in at least approximately a selected position.

Figure 4:
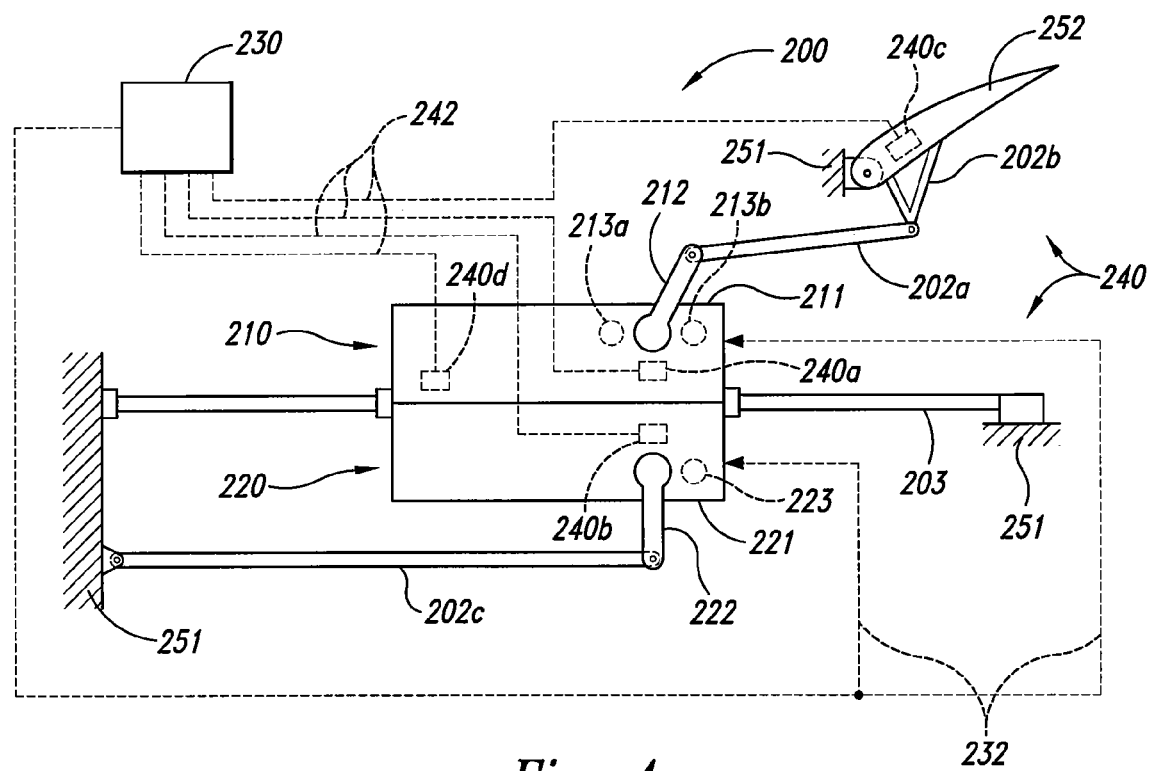
FIG. 4 is a partially schematic illustration of the actuator system shown in FIG. 3 with the actuator apparatus in a second apparatus position and the actuator device in the first device position in accordance with other embodiments of the disclosure.

For example, FIG. 4 is a partially schematic illustration of the actuator system 200 shown in FIG. 3 with the actuator apparatus 210 in the second apparatus position and the actuator device 220 in the first device position. In FIG. 4, the actuator apparatus 210 has moved from the first position (shown in FIG. 3) to the second position while the actuator device 220 has remained in the first position. Because the actuator device 220 in FIG. 4 has remained in the first device position, the actuator apparatus 210 and the actuator device 220 have not translated along the support 203 as the actuator apparatus 210 has moved from the first apparatus position to the second apparatus position. Accordingly, in FIG. 4 movement of the actuator apparatus 210 from the first apparatus position to the second apparatus position has caused the second structure 252 to move relative to the first structure 251 from the first structure position shown in FIG. 3 to the second structure position (e.g., to deflect trailing edge up from a neutral position).

Figure 5:
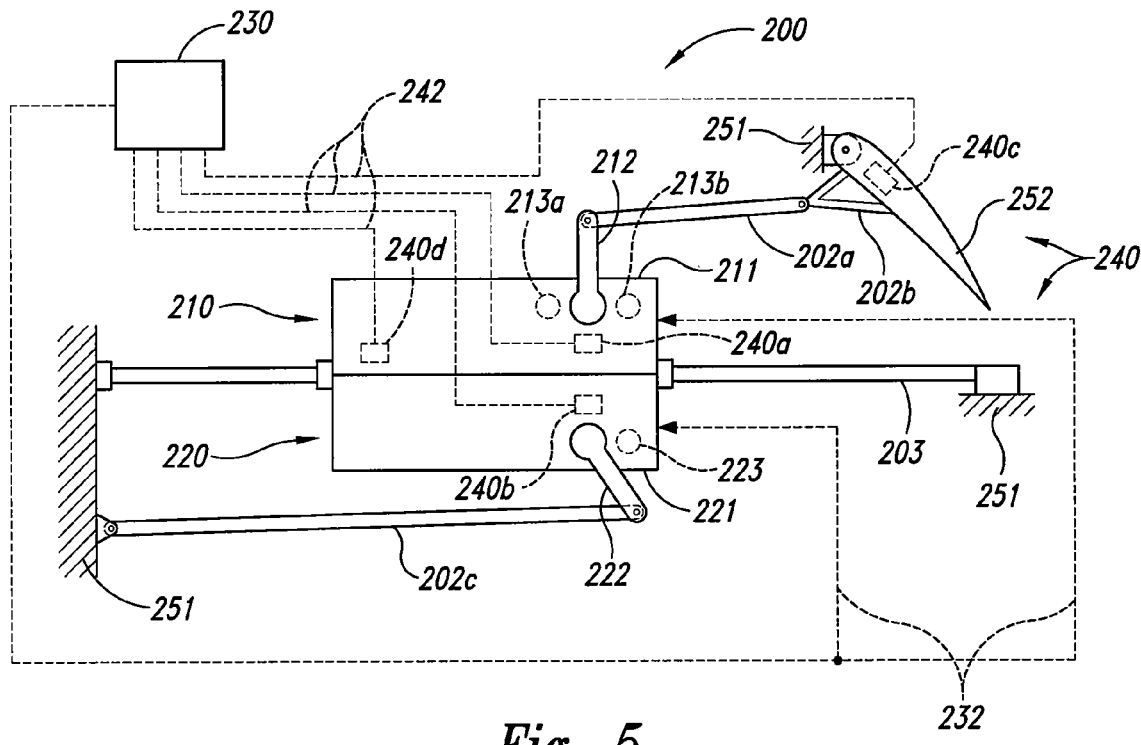
FIG. 5 is a partially schematic illustration of the actuator system shown in FIG. 3 with the actuator device in a second device position and the actuator apparatus in the first apparatus position in accordance with still other embodiments of the disclosure.

FIG. 5 is a partially schematic illustration of the actuator system 200 shown in FIG. 3 with the actuator device 220 in a second device position, the actuator apparatus 210 in the first apparatus position, and the first and second structures 251, 252 in the third structure position. If the actuator apparatus 210 is in the first apparatus position and the actuator device 220 is moved from the first device position (as shown in FIG. 3) to the second device position, the actuator apparatus 210 and the actuator device 220 can translate along the support 203 (e.g., translate to the left along the support 203 as compared to the position of the actuator apparatus 210 and the actuator device 220 shown in FIG. 3). If the actuator apparatus 210 remains in the first apparatus position while the device 220 is moved from the first device position to the second device position, the translation of the actuator apparatus 210 and the actuator device 220 on the support 203 can cause the first and second structures 251, 252 to move from the first structure position (shown in FIG. 3) to the third structure position (shown in FIG. 5). For example, in the illustrated embodiment the translation of the actuator apparatus 210 and the actuator device 220 on the support 203 can cause the second structure 252 to be deflected trailing edge down from the neutral position (e.g., from the position shown in FIG. 3).

Figure 6:
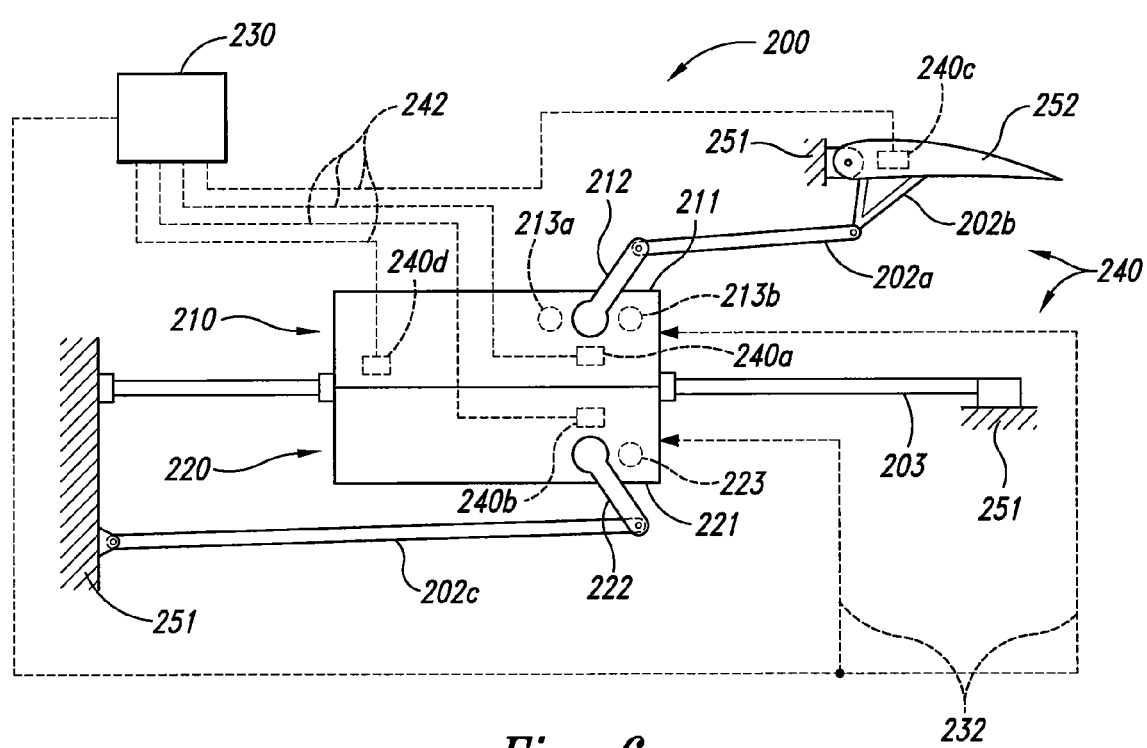
FIG. 6 is a partially schematic illustration of the actuator system shown in FIG. 3 with the actuator apparatus in the second apparatus position and the actuator device in the second device position in accordance with yet other embodiments of the disclosure.

FIG. 6 is a partially schematic illustration of the actuator system 200 shown in FIG. 3 with the actuator apparatus 210 in the second apparatus position and the actuator device 220 in the second device position. In FIG. 6, movement of the actuator device 220 from the first device position (shown in FIG. 3) to the second device position has caused the actuator apparatus 210 and the actuator device 220 to translate along the support 203 as compared to the position of the actuator apparatus 210 and the actuator device 220 shown in FIG. 3. In the illustrated embodiment, the actuator apparatus 210 has moved from the first apparatus position (shown in FIG. 3) to the second apparatus position so that the first and second structures 251, 252 are position in at least approximately the first structure position when the actuator apparatus 210 is in the second apparatus position and the actuator device 220 is in the second device position. For example, in selected embodiments the first and second structures 251, 252 being in at least approximately the first structure position can include the first and second structures 251, 252 being not more than 2% of the total range of travel between the first and second structures 251, 252 away from the first structure position. In other embodiments, the movement of the actuator apparatus 210 and the actuator device 220 can be coordinated so that the first and second structures 251, 252 remains in at least approximately the first structure position while the actuator apparatus 210 moves from the first apparatus position (shown in FIG. 3) to the second apparatus position and the actuator device 220 moves from the first device position (shown in FIG. 3) to the second device position. In still other embodiments, the actuator apparatus 210 and/or the actuator device 220 can have different and/or additional positions or position combinations.

In the illustrated embodiment, a controller 230 can be operably coupled to the actuator apparatus 210 and the actuator device 220. The controller 230 can include a portion of a control system (e.g., a flight control system) and can be configured to provide inputs 232 to the actuator apparatus 210 and the actuator device 220 to move the actuator device 220 and the actuator apparatus 210 between various device positions and apparatus positions (e.g., as described above). In selected embodiments, the inputs 232 can include various types of inputs or signals (e.g., electrical, mechanical, pneumatic, hydraulic, electromagnetic, and/or the like).

In certain embodiments, the controller 230 can include at least a portion of a computing system and can receive various commands (e.g., control commands for positioning a control surface on an aerospace vehicle) and signals 242 from various sensors 240 and/or other control system components. In selected embodiments the controller 230 can include one or more portions of a distributed computing system. In other embodiments, the controller 230 can have other configurations. For example, in certain embodiments the controller can include a control inceptor for receiving commands directly from an operator and for providing unfiltered inputs based on the commands directly to the actuator apparatus 210 and the actuator device 220.

In the illustrated embodiment, the controller 230 includes at least a portion of a computing system that is configured to receive signals 242 from various sensors 240, shown as a first sensor 240a, a second sensor 240b, a third sensor 240c, and a fourth sensor 240d. In FIGS. 3-6, the first sensor 240a is positioned and configured to sense a relative position between the first and second portions 211, 212 of the actuator apparatus 210 (e.g., to sense apparatus position). The second sensor 240b is positioned and configured to sense a relative position between the first and second portions 221, 222 of the actuator device 220 (e.g., to sense device position). The third sensor 240c is positioned and configured to sense a relative position between the first structure 251 and the second structure 252

(e.g., to sense structure position). The fourth sensor 240*d* is positioned and configured to sense a relative position of the actuator apparatus 210 and the actuator device 220 along the support 203. In the illustrated embodiment, the sensors 240 are operably coupled to the controller 230 and can include various types of sensors including potentiometers or other types of electro-mechanical sensors, encoders, proximity sensors, and/or the like.

Figure 7:
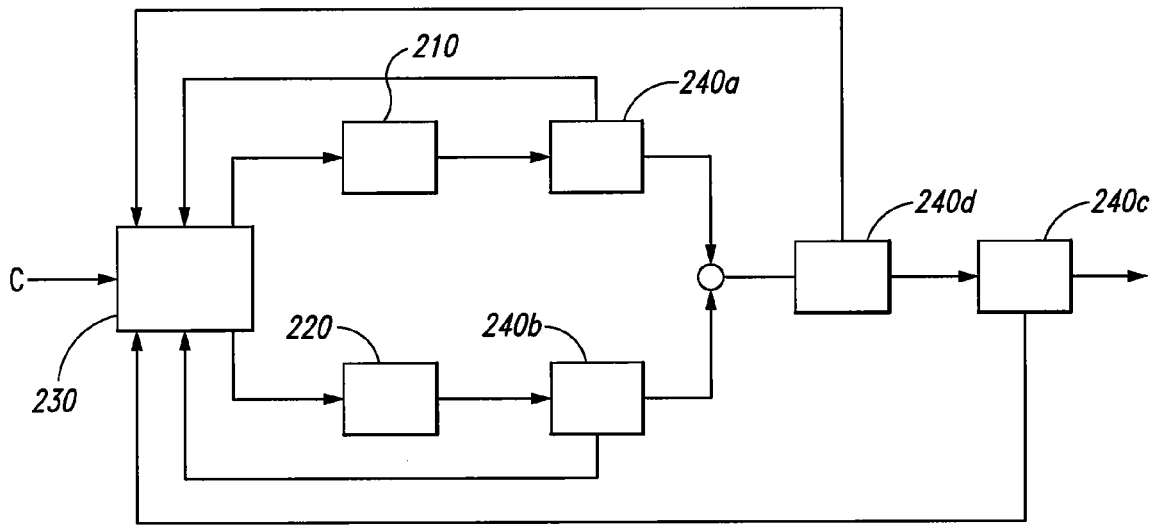
FIG. 7 is a partially schematic logic diagram of the control logic that an actuator system controller can use to provide inputs to the actuator apparatus and the actuator device shown in FIG. 3 in accordance with certain embodiments of the disclosure.

FIG. 7 is a partially schematic logic diagram of the control logic that the actuator system controller 230 shown in FIGS. 3-6 can use to provide input(s) to command the actuation of the actuator apparatus 210 and the actuator device 220 shown in FIG. 3. In FIG. 7 the controller 230 can receive one or more commands C, for example, from other portions of the control system and/or from an operator (e.g., a pilot or a remote operator). Additionally, in the illustrated embodiment the controller 230 receives one or more signals from the first, second, third, and/or fourth sensors 240*a*-*d*. In the illustrated embodiment, the controller 230 can use the command(s) and/or signal(s) to determine (e.g., compute or calculate) one or more inputs to be provided to the actuator apparatus 210 and/or the actuator device 220.

For example, in certain embodiments the controller 230 can receive a command C to position the first and second structures 251, 252 and a selected relative position (e.g., a selected structure position). The controller 230 can send signal(s) to the actuator apparatus 210 and/or the actuator device 220 to cause the actuator apparatus 210 and/or the actuator device 220 to move the second structure 252 relative to the first structure 251. After the actuator apparatus 210 and/or the actuator device 220 have moved the second structure 252 relative to the first structure 251, the third sensor 240*c* can sense an at least approximate actual relative position between the first and second structures 251, 252. The third sensor 240*c* can then send a signal to the controller 230 communicating the sensed actual relative position between the first and second structures 251, 252. The controller 230 can compare the actual relative position to the selected relative position and send one or more additional inputs to the actuator apparatus 210 and/or the actuator device 220 to correct the actual relative position as required. In other embodiments, the controller 230 can provide an error signal (e.g., to an operator) if the sensed actual relative position varies from the selected relative position more than a selected amount.

In the illustrated embodiments, the actuator apparatus 210 and the actuator device 220 can be capable of producing similar rates, forces, and ranges of travel. During normal operation the actuator device 220 can remain in a fixed position while the actuator apparatus 210 is used to move the second structure 252 relative to the first structure 251. If the actuator apparatus 210 malfunctions (e.g., becomes jammed, experiences a partial failure, and/or experiences a total failure), the controller 230 can determine that the performance of the actuator apparatus 210 has been degraded, for example, by comparing the sensed position of the first and second structures 251, 252 to the commanded position. Upon sensing a malfunction, the controller 230 can provide one or more inputs to the actuator device 220 to position the first and second structures 251, 252 relative to one another (e.g., including correcting errors between the sensed position and the commanded position). In certain embodiments, the controller 230 can also provide one or more inputs to the malfunctioning actuator apparatus 210 to remain in a selected or a failed position once the actuator device 220 is being used to move the first and second structures 251, 252 relative to one another.

In certain embodiments, where during normal operation the actuator device 220 remains in a fixed position while the actuator apparatus 210 is used to move the second structure 252 relative to the first structure 251, the actuator apparatus 210 can include electric actuator(s) with (or associated with) fuse(s) or circuit breaker(s) that can open in response to selected malfunctions. The electric actuator(s) can be configured so that once power is removed from the actuator apparatus 210, the actuator apparatus 210 will remain in a fixed or selected position (e.g., the position in which the failure occurred). Additionally, the actuator device 220 can be configured such that it can provide a desired range of motion between the first and second structures 251, 252 regardless of the position of the actuator apparatus 210. Accordingly, the actuator system 200 can provide the desired range of motion between the first and second structures 251, 252 even with a failure.

Because in the illustrated embodiment the actuator apparatus 210 and the actuator device 220 can be capable of producing similar rates, forces, and ranges of travel, the actuator device 220 provides redundancy for the actuator system 200 while maintaining performance parameters similar to those achieved with the actuator apparatus 210. In other embodiments, the actuator apparatus 210 and the actuator device 220 can have different performance capabilities (e.g., different rate, force, and/or range of travel capabilities). For example, in other embodiments the actuator device 220 can have a limited range of travel as compared to the actuator apparatus 210.

In other embodiments, the actuator system 200 can use other sensor arrangements including more sensors, fewer sensors, and/or different sensor configurations. For example, in other embodiments the sensed relative position between the first and second structures 251, 252 can be determined using the first and second sensors 240*a*, 240*b*. The relative position between the first and second structures 251, 252 can be a function of the relative position between the first and second portions 211, 212 of the actuator apparatus 210 and the relative position between the first and second portions 221, 222 of the actuator device 220. As discussed above, the first sensor 240*a* is positioned to sense the relative position between the first and second portions 211, 212 of the actuator apparatus 210 and the second sensor 240*b* is positioned to sense the relative position between the first and second portions 221, 222 of the actuator device 220. Accordingly, the controller 230 can use the sensed relative position between the first and second portions 211, 212 of the actuator apparatus 210 and the sensed relative position between the first and second portions 221, 222 of the actuator device 220 to determine a sensed position of the first structure 251 relative to the second structure 252.

In still other embodiments, the first and fourth sensors 240*a*, 240*d* can provide signals to the controller 230 that can be used to determine a sensed relative position between the first and second structures 251, 252. The relative position between the first and second structures 251, 252 can also be a function of the relative position between the first and second portion 211, 212 of the actuator apparatus 210 and the relative position of the actuator apparatus 210 in the actuator device 220 along the support (shown in FIGS. 3-6). The first sensor 240*a* is positioned to sense the relative position between the first and second portions 211, 212 of the actuator apparatus 210 and the fourth sensor 240*d* is positioned to sense a relative position of the actuator apparatus 210 and the actuator device 220 along the support 203. Accordingly, the controller can use the sensed relative position between the first and second portions 211, 212 of the actuator apparatus 210 and the sensed relative position of the actuator apparatus 210 and the actuator device 220 along the support 203 to determine a sensed position of the first structure 251 relative to the second structure 252. In yet other embodiments, various sensor combinations can be used together with one another to provide redundancy, to provide increased accuracy, and/or to provide position verification (e.g., to provide a crosscheck between selected combinations).

In yet other embodiments, the actuator apparatus 210 and the actuator device 220 can be used in combination to move the first and second structures 251, 252 relative to one another. For example, in selected embodiments the actuator apparatus 210 can be placed in a selected apparatus position and the actuator device 220 can be placed in a selected device position, the combination of which will provide a selected relative position between the first and second structures 251, 252 (e.g., a structure position). In certain embodiments, the actuator apparatus 210 can be responsible for 50% of the movement between the first and second structures 251, 252 and the actuator device 220 can be responsible for 50% of the movement between the first and second structures 251, 252. In other embodiments, the actuator apparatus 210 and the actuator device 220 can be responsible for different percentages and/or varying percentages of the movement between the first and second structures 251, 252.

In certain embodiments, various sensor combinations can be used in a manner similar to that discussed above when the actuator apparatus 210 and the actuator device 220 are both responsible for a portion of the movement between the first structure 251 and the second structure 252. For example, after sending one or more input commands to the actuator apparatus 210 and/or the actuator device 220, the controller 230 can compare the sensed apparatus position, the sensed device position, and/or the sensed structure positions to the corresponding input(s) that the controller 230 provided to the actuator apparatus 210 and/or the actuator device 220. In certain embodiments, this comparison can be used to determine error(s) between the commanded position(s) and the sensed position(s), and can allow the controller 230 to calculate or determine additional input(s) to correct at least a portion of the error(s). In other embodiments, the controller 230 can receive a command to place the first and second structures 251, 252 in a selected position and use various sensed position(s) to compute or calculate input(s) to send to the actuator apparatus 210 and/or the actuator device 220 to place the first and second structures 251, 252 in a selected position.

In still other embodiments, the controller 230 can compare the sensed apparatus position, the sensed device position, and/or the sensed structure positions to the corresponding input(s) to determine if there are one or more malfunctions associated with the actuator system 200. For example, in selected embodiments where movements of the actuator apparatus 210 and the actuator device 220 are combined to move the first and second structures 251, 252, the controller 230 can compensate for a malfunction in the actuator apparatus 210 by using the actuator device 220. For instance, in certain embodiments if the controller 230 determines that the actuator apparatus 210 is malfunctioning, the controller 230 can send an input to the actuator apparatus 210 to remain in a fixed position (e.g., remain in the failed position) and provide inputs to the actuator device 220 to move the first and second structures 251, 252 to a selected relative position. In other embodiments, the controller 230 can compensate for a malfunction involving the actuator device 220 using the actuator apparatus 210.

As discussed above with reference to FIGS. 3-6, in selected embodiments the first and second structures 251, 252 can be positioned in a selected structure position and the controller 230 can provide input(s) to reposition the actuator apparatus 210 and the actuator device 220 so that the first and second structures 251, 252 remain in, or are returned to, at least approximately the selected structure position. In certain embodiments, the controller 230 can compute the input(s) using various sensor signals to determine the sensed apparatus position, the sensed device position, and/or the sensed structure position. For example, in selected embodiments the sensed device position can be sensed directly by the second sensor 240b, or can be determined from the sensed apparatus position using the first sensor 240a and from the sensed structure position using the third sensor 240c, or can be determined using the sensed position of the actuator apparatus 210 and the actuator device 220 along the support 203. In other embodiments, the sensed apparatus position can be determined directly by the first sensor 240a or determined from the sensed structure position using the third sensor 240c and the sensed device position using the second sensor 240b or the position of the actuator apparatus 210 and the actuator device 220 along the support 203.

A feature of at least some of the embodiments discussed above is that the actuator apparatus and the actuator device can provide redundancy. For example, as discussed above, in certain embodiments the actuator apparatus and the actuator device can be independently capable of providing the actuator system with at least approximately the same range of travel and/or the same rate of travel as is available with the actuator apparatus and the actuator device functioning together. An advantage of this feature is that in selected embodiments the actuator system can be fault tolerant, providing little or no degradation in performance when selected failures occur.

Another feature of at least some of the embodiments discussed above is that relative motion between the first and second portions of the actuator apparatus can cause the first and second structures to move relative to one another without causing relative motion between the first and second portions of the actuator device. Additionally, relative motion between the first and second portions of the actuator device can cause the first and second structures to move relative to one another without causing relative motion between the first and second portions of the actuator apparatus. In certain embodiments, an advantage of this feature is that if the actuator apparatus or the actuator device malfunctions (e.g., becomes jammed or partially jammed), the non-malfunctioning actuator apparatus or actuator device can provide movement between the first and second structures 251, 252 without having to produce additional force to move the first and second portions of the malfunctioning actuator apparatus or actuator device.

Still another feature of at least some of the embodiments discussed above is that the actuator apparatus and the actuator device can have multiple apparatus and device positions for a selected structure position. For example, in selected embodiments the actuator apparatus can be moved from a first to a second apparatus position and the actuator device can be moved from a first to a second device position while the first and second structures are retained in at least approximately a selected structure position. An advantage of this feature is that it can reduce wear and tear on various components associated with the actuator system.

For example, in selected embodiments an aerospace vehicle control surface can spend a substantial amount of time in approximately the same position (e.g., a trimmed level flight position) about which the control surface is periodically moved to maneuver the aerospace vehicle. Because the control surface spends a substantial amount of time in the same position, current actuators, sensors, bearings, and other components associated with the actuator can become substantially worn in areas associated with the selected position. For example, a potentiometer or other type of electro-mechanical sensor can become worn in an area associated with the actuator position corresponding to the selected control surface position, and can eventually malfunction (e.g., fail to sense a position associated with the actuator). Accordingly, in selected embodiments an actuator system similar to the actuator system discussed above with reference to FIGS. 2-6 can be used to change the apparatus position and the device position periodically at least approximately at a selected time interval (e.g., the controller can automatically provides one or more inputs to change the apparatus and the device positions every five minutes) during the operation while retaining the control surface in at least approximately a selected position so that various components associated with the actuator system (e.g., at least some of the sensors) can be repositioned to reduce wear and tear on selected areas. For example, in selected embodiments an electro-mechanical type sensor having a sensor position corresponding to the apparatus position and/or the device position can be periodically repositioned (e.g., from a first sensor position to a different second sensor position) while the control surface remains in at least approximately the selected position.

In other embodiments, the actuator system can have other arrangements. For example, although in FIGS. 2-6 the actuator apparatus and the actuator device have different configurations (e.g., the actuator apparatus includes two actuators and the actuator device includes a single actuator), in other embodiments the actuator apparatus and the actuator device can be at least approximately identical. In still other embodiments the actuator system can include more or different types of actuator apparatuses and/or actuator devices. For example, although in FIGS. 3-6 the actuator apparatus and the actuator device include second portions having arm-like elements that rotate through a range of angles with respect to the first portions to provide a linear-like motion to various associated linkages, in other embodiments the actuator apparatus and/or the actuator device can have elements that rotate with respect to one another to provide a rotational motion or that move linearly with respect to one another.

Figure 8:
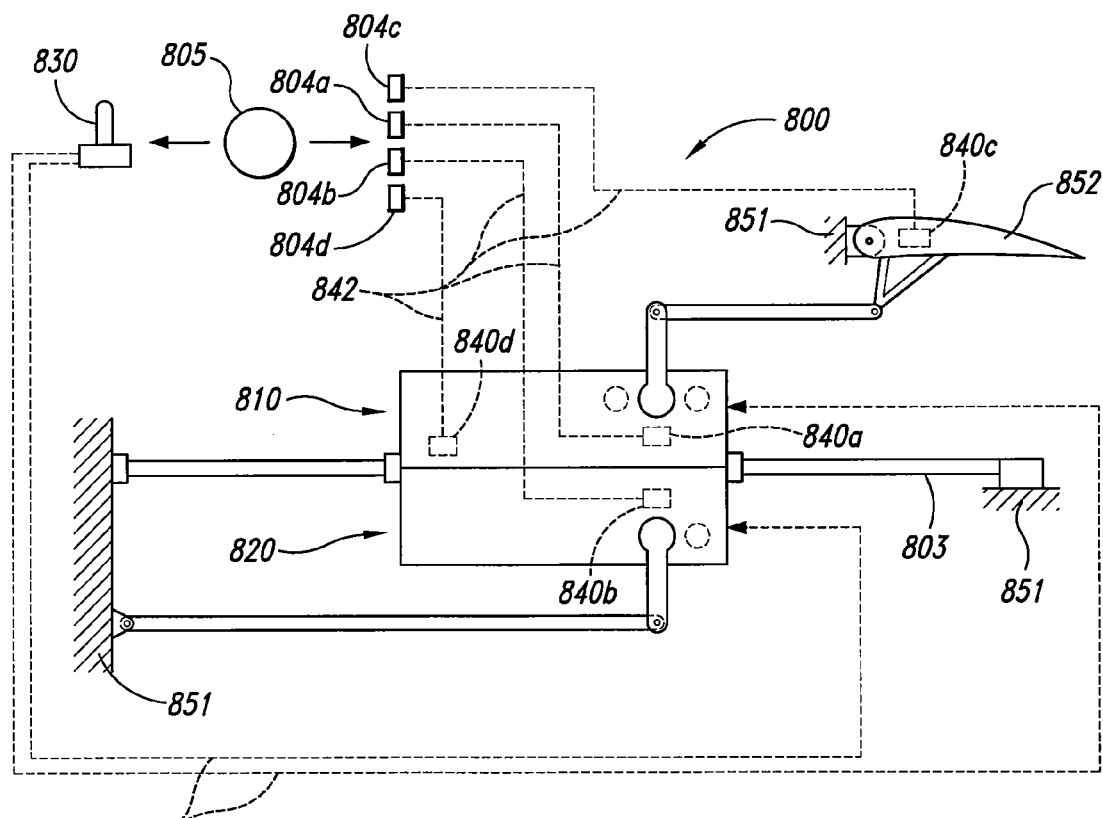
FIG. 8 is a partially schematic illustration of an actuator system controller in accordance with other embodiments of the disclosure.

FIG. 8 is a partially schematic illustration of an actuator system 800 similar to the actuator system shown in FIGS. 3-6, but with a controller 830 that includes a control inceptor in accordance with other embodiments of the disclosure. In FIG. 8, the actuator system 800 includes a first structure 851, a second structure 852, a support 803, an actuator apparatus 810, and an actuator device 820 similar to the first structure, second structure, support, actuator apparatus, and actuator device shown in FIGS. 3-6. Additionally, the first structure 851, the second structure 852, the support 803, the actuator apparatus 810, and the actuator device 820 are position and arranged to function in a manner similar to that described above with reference to FIGS. 3-6.

In FIG. 8, the actuator system 800 includes a first sensor 840a, a second sensor 840b, a third sensor 840c, and a fourth sensor 840d similar to the first, second, third, and fourth sensors shown in FIGS. 3-6. The first sensor 840a, the second sensor 840b, the third sensor 840c, and a fourth sensor 840d are configured and position to provide signals 842 similar to the signals discussed above with reference to FIGS. 3-6. For example, the first sensor 840a provides a signal corresponding to an apparatus position, the second sensor 840b provides a signal corresponding to a device position, the third sensor 840c provides a signal corresponding to a structure position, and fourth sensor 840d provides a signal corresponding to a position of the actuator apparatus 810 and actuator device 820 along the support 803.

In FIG. 8, the first, second, third, and fourth sensors 840a-d are operatively coupled to a first display 804a, a second display 804b, a third display 804c, and a fourth display 804d, respectively. An operator 805 can use the sensed position from the first, second, third, and/or fourth sensors 840a-d to monitor the sensed apparatus position, the sensed device position, the sensed structure position, and/or the sensed position of the actuator apparatus 810 and actuator device 820 along the support 803. The operator 805 can also use the controller 830 (e.g., a control inceptor) to provide one or more inputs 832 to the actuator apparatus 810 and/or the actuator device 820 based on the displayed sensed positions in a manner similar to that of the controller 230 (e.g., a portion of the computing system) discussed above with reference to FIGS. 3-6.

In certain embodiments, the operator 805 can be located remotely from (e.g., external to) the aerospace vehicle and can communicate with and/or operate the controller 830 via a remote control device (e.g., a remote control device 299 shown in FIG. 2). For example, in selected embodiments the operator 805 can monitor the displays remotely to determine whether the actuator apparatus 810 or actuator device 820 has malfunctioned, to provide inputs to the actuator apparatus 810 and/or actuator device 820, to retain the actuator apparatus 810 and/or actuator device 820 in a selected position (e.g., in the event of a failure), and/or the like. In other embodiments, the controller 830 can include a portion of a computing system and be configured for a combination of both automated and manual operation. In still other embodiments, the remote control device 299 can include at least a portion of the controller 830 and the controller 830 can provide inputs to the actuator apparatus 810 and/or the actuator device 820 via a wireless receiver carried by the aerospace vehicle. Some of the embodiments discussed above with reference to FIG. 8 can have features and advantages similar to those discussed above with reference to FIGS. 2-6.

Figure 9:
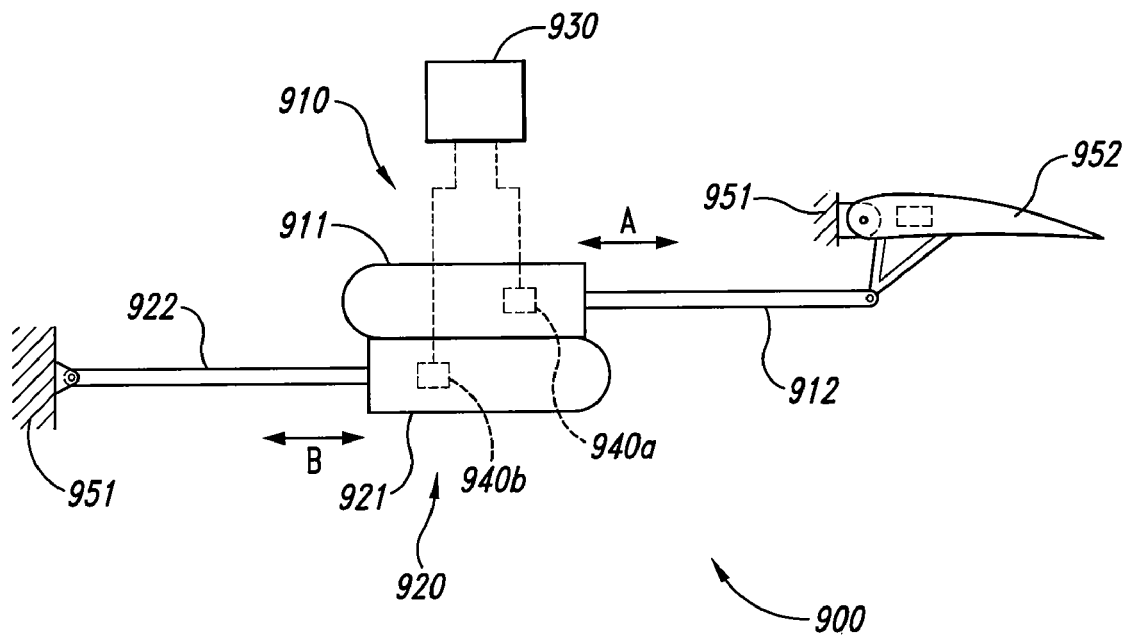
FIG. 9 is a partially schematic illustration of an actuator system in accordance with still other embodiments of the disclosure.

FIG. 9 is a partially schematic illustration of an actuator system 900 having an actuator apparatus 910 that provides linear motion and an actuator device 920 that provides linear motion operably coupled in series between a first structure 951 and a second structure 952. In FIG. 9, the second structure 952 is pivotally coupled to the first structure 951 to be movable between a first structure position and a second structure position. In the illustrated embodiment, the actuator apparatus 910 includes a first portion 911 and the second portion 912 movable relative to the first portion 911 (as shown by Arrow A) between a first apparatus position and a second apparatus position when the actuator apparatus 910 is actuated. In FIG. 9, the actuator device 920 includes a first portion 921 and a second portion 922 movable relative to the first portion 921 (as shown by Arrow B) between a first device position and a second device position when the actuator device 920 is actuated.

In the illustrated embodiment, the actuator apparatus 910 and actuator device 920 are at least approximately identical and the first portion 911 of the actuator apparatus 910 is coupled to the first portion 921 of the actuator device 920. The second portion 912 of the actuator apparatus 910 is coupled to a portion of the second structure 952 and the second portion 922 of the actuator device 920 is coupled to a portion of the first structure 951. Accordingly, motion between the first portion 911 and the second portion 912 of the actuator apparatus 910 can cause the first and second structures 951, 952 to move relative to one another without causing motion between the first portion 921 and the second portion 922 of the actuator device 920. Additionally, motion between the first portion 921 and the second portion 922 of the actuator device 920 can cause the first and second structures 951, 952 to move relative to one another without causing motion between the first portion 911 and the second portion 912 the actuator apparatus 910.

In FIG. 9, the actuator system 900 includes a first sensor 940a positioned to sense the relative position between the first portion 911 and a second portion 912 of the actuator apparatus 910, and a second sensor 940b positioned to sense the relative position between the first portion 921 and the second portion 922 of the actuator device 920. The first and second sensors 940a, 940b are operably coupled to a controller 930 similar to the controller discussed above with reference to FIGS. 3-6. The controller 930 is configured to receive signals from the first and second sensors 940a, 940b, and to provide inputs to the actuator apparatus 910 and the actuator device 920 to move the first and second structures 951, 952 relative to one another. Additionally, the controller 930 is configured to provide inputs to cause the actuator apparatus 910 to move from the first apparatus position to the second apparatus position and to cause the actuator device 920 to move from the first device position to the second device position while maintaining the first and second structures 951, 952 in at least approximately a selected position.

In other embodiments, the actuator system 900 can have other arrangements. For example, in other embodiments the actuator system can include other types of actuator apparatuses and/or actuator devices. In still other embodiments, the actuator system can include multiple actuator apparatuses and/or actuator devices. At least some of the embodiments discussed above with reference to FIG. 9 can have features and advantages similar to those discussed above with reference to FIGS. 2-6.

Figure 10:
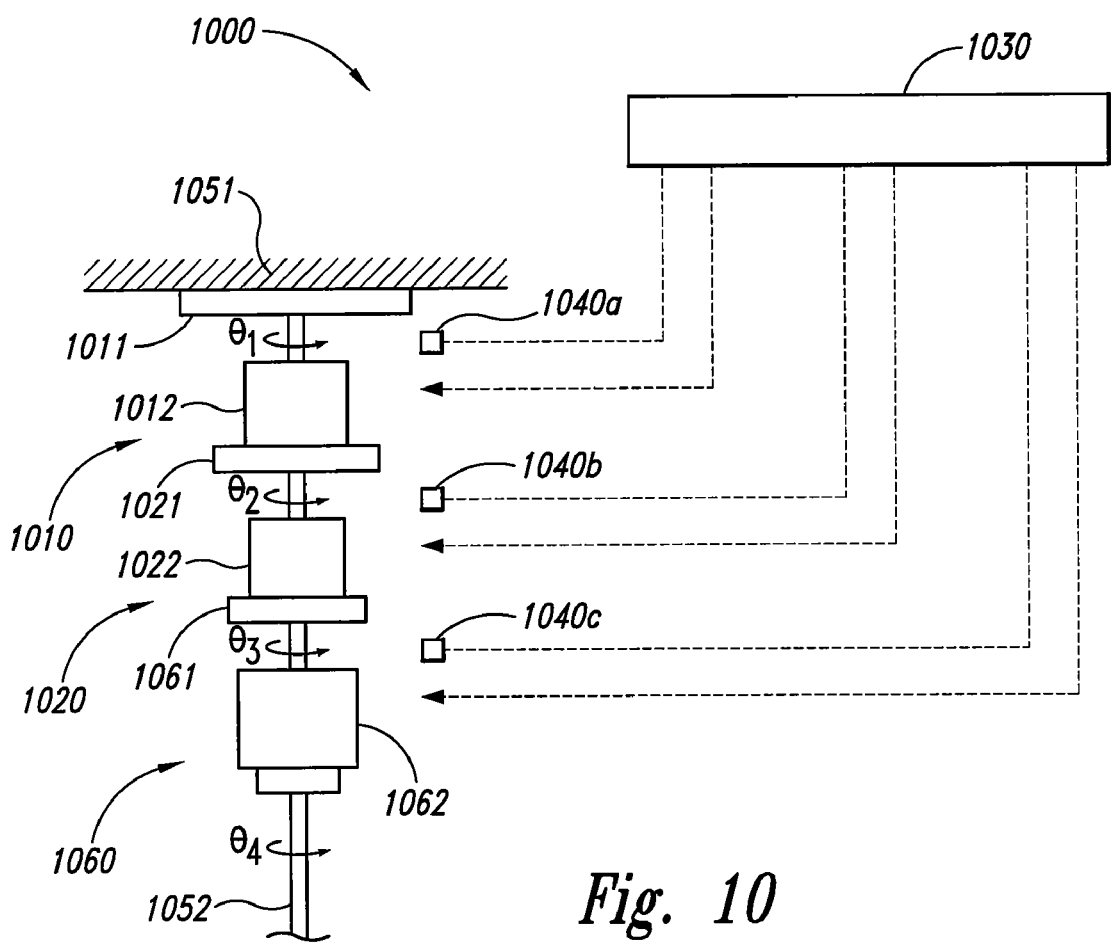
FIG. 10 is a partially schematic illustration of an actuator system in accordance with yet other embodiments of the disclosure.

FIG. 10 is a partially schematic illustration of an actuator system 1000 having a first actuator apparatus 1010, a second actuator apparatus 1060, and an actuator device 1020 operably coupled in series between a first structure 1051 and a second structure 1052. In FIG. 10, the first actuator apparatus 1010 includes a first portion 1011 and a second portion 1012 rotatably movable relative to one another when the actuator apparatus 1010 is actuated. In the illustrated embodiment, the relative position between the first portion 1011 and the second portion 1012 of the first actuator apparatus 1010 is shown as a first angle $\theta_1$ (e.g., an angular position relative to a selected position). In FIG. 10, the actuator device 1020 includes a first portion 1021 and a second portion 1022 rotatably movable relative to one another when the actuator device 1020 is actuated. In the illustrated embodiment, the relative position between the first portion 1021 and the second portion 1022 of the actuator device 1020 is shown as a second angle $\theta_2$. In FIG. 10, the second actuator apparatus 1060 includes a first portion 1061 and a second portion 1062 rotatably movable relative to one another when the second actuator apparatus 1060 is actuated. In the illustrated embodiment, the relative position between the first portion 1061 and a second portion 1062 of the second actuator apparatus 1060 is shown as a third angle $\theta_3$.

In the illustrated embodiment, the first structure 1051 and the second structure 1052 are rotatably movable relative to one another. In the illustrated embodiment, the relative position between the first structure 1051 and the second structure 1052 is shown as a fourth angle $\theta_4$. For example, in selected embodiments of the first structure 1051 can include an aerospace vehicle airfoil or an aerospace vehicle fuselage and the second structure 1052 can include a portion of a torque tube (e.g., coupled to a flight control surface). In FIG. 10, the first portion 1011 of the first actuator device 1010 is connected directly to the first structure 1051 and the second portion 1062 of the second actuator apparatus 1060 is connected directly to the second structure 1052. Accordingly, in the illustrated embodiment the fourth angle $\theta_4$ is equal to the sum of the first angle $\theta_1$, the second angle $\theta_2$, and the third angle $\theta_3$. In selected embodiments, the angles $\theta_1$, $\theta_2$, $\theta_3$, and/or $\theta_4$ can be positive or negative and can have a magnitude of equal to, less than, or greater than 360 degrees.

In FIG. 10, relative motion between the first and second portions 1011, 1012 of the first actuator apparatus 1010 can cause a change in the fourth angle $\theta_4$ without causing a change in the second or third angles $\theta_2$, $\theta_3$. Additionally, relative motion between the first and second portions 1021, 1022 of the actuator device 1020 can cause a change in the fourth angle $\theta_4$ without causing a change in the first or third angles $\theta_1$, $\theta_2$. Furthermore, relative motion between the first and second portions 1061, 1062 of the second actuator apparatus 1060 can cause a change in the fourth angle $\theta_4$ without causing a change in the first or second angles $\theta_1$, $\theta_2$.

In the illustrated embodiment, the actuator system 1000 includes a first sensor 1040a, a second sensor 1040b, and a third sensor 1040c for sensing the angles $\theta_1$, $\theta_2$, and $\theta_3$, respectively. In FIG. 10, the first, second, and third sensors 1040a, 1040b, 1040c operably coupled to a controller 1030 similar to the controller discussed above with reference to FIGS. 3-6. The controller 1030 can receives signals from the first, second, and third sensors 1040a, 1040b, 1040c and provide inputs to the first actuator apparatus 1010, the actuator device 1020, and/or the second actuator apparatus 1060 to move the first and second structures 1051, 1052 to one more selected positions. Additionally, the controller 1030 can be configured to provide inputs to the first actuator apparatus 1010, the actuator device 1020, and/or the second actuator apparatus 1060 to change at least two of the first angle $\theta_1$, the second angle $\theta_2$, and the third angle $\theta_3$ while maintaining the first and second structures 1051, 1052 in at least approximately a selected position (e.g., maintaining the fourth angle $\theta_4$ at least approximately constant).

In other embodiments, the actuator system 1000 can have other arrangements. For example, in other embodiments the first actuator device 1010 and the second actuator apparatus 1060 can be coupled to the first and second structure 1051, 1052 via other arrangements (e.g., using one more linking devices). In still other embodiments, the actuator system can include more or fewer actuator apparatuses, more actuator devices, different types of actuator apparatus(es), and/or different types of actuator device(s). Some of the embodiments discussed above with reference to FIG. 10 can have features and advantages similar to those discussed above with reference to FIGS. 2-6.

From the foregoing, it will be appreciated that specific embodiments of the disclosure have been described herein for purposes of illustration, but that various modifications may be made without deviating from the disclosure. For example, aspects of the disclosure described in the context of particular embodiments may be combined or eliminated in other embodiments. For instance, although many of the embodiments have been discussed above with reference to aerospace vehicles, in other embodiments one or more actuator systems can be used in non-vehicular applications. For example, in selected embodiments the actuator system can be configured and positioned to move two structures in a building relative to one another (e.g., to move structures associated with a stationary crane or lift). Although advantages associated with certain embodiments of the disclosure have been described in the context of those embodiments, other embodiments may also exhibit such advantages. Additionally, not all embodiments need necessarily exhibit such advantages to fall within the scope of the disclosure. Accordingly, the invention is not limited except as by the appended claims.

I claim:

1. An aerospace vehicle system, comprising:
   a structure;
   a control surface movable relative to the structure;
   an actuator apparatus having a first portion and a second portion movable relative to the first portion when the actuator apparatus is actuated;
   an actuator device having a first portion and a second portion movable relative to the first portion when the actuator device is actuated, the actuator apparatus and the actuator device being coupled in series between the structure and the control surface, with the first portion of the actuator apparatus and the first portion of the actuator device connected to each other to translate together as a unit along a support; and
   a controller operably coupled to the actuator apparatus and the actuator device, the controller being programmed with instructions to automatically actuate the actuator apparatus and the actuator device so that a position of the control surface relative to the structure after the actuator apparatus and the actuator device have been actuated is at least approximately the same as a position of the control surface relative to the structure before the actuator apparatus and the actuator device have been actuated.

2. The system of claim 1, further comprising an electromechanical sensor having a sensor position corresponding to at least one of a relative position between the first and second portions of the actuator apparatus and a relative position between the first and second portions of the actuator device, wherein the sensor position is different after the actuator apparatus and the actuator device have been actuated as compared to before the actuator apparatus and the actuator device have been actuated.

3. The system of claim 1 wherein the controller is programmed with instructions to automatically actuate the actuator apparatus and the actuator device periodically at least approximately at a selected time interval.

4. The system of claim 1, further comprising at least one of:
   a first sensor operably coupled to the controller and positioned to sense a relative position between the structure and the control surface;
   a second sensor operably coupled to the controller and positioned to sense a relative position between the first portion and the second portion of the actuator apparatus; and
   a third sensor operably coupled to the controller and positioned to sense a relative position between the first portion and the second portion of the actuator device.

5. The system of claim 1 wherein the second portion of the actuator apparatus is rotatably movable relative to the first portion of the actuator apparatus.

6. The system of claim 1 wherein the instructions for automatically actuating the actuator apparatus and the actuator device so that a position of the control surface relative to the structure after the actuator apparatus and the actuator device have been actuated is at least approximately the same as a position of the control surface relative to the structure before the actuator apparatus and the actuator device have been actuated are programmed to be executed during normal vehicle operations.

7. The system of claim 1 wherein the controller is further programmed with instructions to automatically actuate one of the actuator device and the actuator apparatus to move the control surface relative to the structure in response to an indication that the other of the actuator device and the actuator apparatus experiences a fault.

8. An actuator system, comprising:
   a first structure;
   a second structure movable relative to the first structure;
   an actuator apparatus having a first portion and a second portion movable relative to the first portion when the actuator apparatus is actuated;
   an actuator device having a first portion and a second portion movable relative to the first portion when the actuator device is actuated, the actuator apparatus and the actuator device being coupled in series between the first structure and the second structure, with the first portion of the actuator apparatus and the first portion of the actuator device connected to each other to translate together as a unit along a support; and
   a controller operably coupled to the actuator apparatus and the actuator device, the controller programmed with instructions to automatically actuate the actuator apparatus and the actuator device so that a position of the first structure relative to the second structure after the actuator apparatus and the actuator device have been actuated is at least approximately the same as a position of the first structure relative to the second structure before the actuator apparatus and the actuator device have been actuated.

9. The system of claim 8, further comprising an electromechanical sensor having a sensor position corresponding to at least one of a relative position between the first and second portions of the actuator apparatus and a relative position between the first and second portion of the actuator device, wherein the sensor position is different after the actuator apparatus and the actuator device have been actuated as compared to before the actuator apparatus and the actuator device have been actuated.

10. The system of claim 8 wherein the controller is programmed with instructions to automatically actuate the actuator apparatus and the actuator device periodically at least approximately at a selected time interval.

11. The system of claim 8 wherein the controller is programmed with instructions to automatically actuate the actuator apparatus and the actuator device so that a position of the first structure relative to the second structure remains at least approximately unchanged while the actuator apparatus and the actuator device are being actuated.

12. The system of claim 8 wherein the actuator apparatus and the actuator device are at least approximately identical to one another.

13. The system of claim 8, further comprising at least one of:
   a first sensor operably coupled to the controller and positioned to sense a relative position between the first structure and the second structure;
   a second sensor operably coupled to the controller and positioned to sense a relative position between the first portion and the second portion of the actuator apparatus; and
   a third sensor operably coupled to the controller and positioned to sense a relative position between the first portion and the second portion of the actuator device.

14. The system of claim 8 wherein the actuator system is carried by an aerospace vehicle.

15. The system of claim 8 wherein at least one of the actuator apparatus and the actuator device include multiple actuators.

16. The system of claim 8 wherein the second portion of the actuator apparatus is rotatably movable relative to the first portion of the actuator apparatus.

17. An actuator system, comprising:
- a first structure;
- a second structure movable relative to the first structure;
- an actuator apparatus having a first portion and a second portion movable relative to the first portion when the actuator apparatus is actuated;
- an actuator device having a first portion and a second portion movable relative to the first portion when the actuator device is actuated, the actuator apparatus and the actuator device being coupled in series between the first structure and the second structure, with the first portion of the actuator apparatus and the first portion of the actuator device connected to each other to translate together as a unit along a support;
- an electro-mechanical sensor having a sensor position corresponding to at least one of a relative position between the first and second portions of the actuator apparatus and a relative position between the first and second portion of the actuator device; and
- a controller operably coupled to the actuator apparatus and the actuator device, the controller programmed with instructions to automatically actuate the actuator apparatus and the actuator device so that a position of the first structure relative to the second structure after the actuator apparatus and the actuator device have been actuated is at least approximately the same as a position of the first structure relative to the second structure before the actuator apparatus and the actuator device have been actuated, the sensor position being different after the actuator apparatus and the actuator device have been actuated as compared to before the actuator apparatus and the actuator device have been actuated.

18. The system of claim 17 wherein the controller is programmed with instructions to automatically actuate the actuator apparatus and the actuator device periodically at least approximately at a selected time interval.

19. An actuator system, comprising:
- a first structure;
- a second structure movable relative to the first structure;
- an actuator apparatus having a first portion and a second portion movable relative to the first portion when the actuator apparatus is actuated;
- an actuator device having a first portion and a second portion movable relative to the first portion when the actuator device is actuated, the actuator apparatus and the actuator device being coupled in series between the first structure and the second structure, with the first portion of the actuator apparatus and the first portion of the actuator device connected to each other to translate together as a unit along a support; and
- control means for providing instructions to the actuator apparatus and the actuator device to automatically actuate the actuator apparatus and the actuator device so that a position of a first structure relative to a second structure after the actuator apparatus and the actuator device have been actuated is at least approximately the same as a position of the first structure relative to the second structure before the actuator apparatus and the actuator device have been actuated.

20. The system of claim 19, further comprising an electro-mechanical sensor having a sensor position corresponding to at least one of a relative position between the first and second portions of the actuator apparatus and a relative position between the first and second portion of the actuator device, wherein the sensor position is different after the actuator apparatus and the actuator device have been actuated as compared to before the actuator apparatus and the actuator device have been actuated.

21. The system of claim 19 wherein the controller means is programmed with instructions to automatically actuate the actuator apparatus and the actuator device periodically at least approximately at a selected time interval.

22. The system of claim 19, further comprising at least one of:
- first sensing means operably coupled the control means and positioned to sense a relative position between the first structure and the second structure;
- second sensing means operably coupled to the control means and positioned to sense a relative position between the first portion and the second portion of the actuator apparatus; and
- third sensing means operably coupled to the control means and positioned to sense a relative position between the first portion and the second portion of the actuator device.

23. The system of claim 19 wherein the actuator system is carried by an aerospace vehicle.

24. The system of claim 19 wherein the second portion of the actuator apparatus is rotatably movable relative to the first portion of the actuator apparatus.

25. A method for positioning an actuator system, comprising:
- automatically sending one or more inputs from a controller to an actuator apparatus and an actuator device, the one or more inputs commanding the actuation of the actuator apparatus and the actuator device;
- actuating the actuator apparatus to move a first portion of the actuator apparatus relative to a second portion of the actuator apparatus in response to the one or more inputs; and
- actuating the actuator device to move a first portion of the actuator device relative to a second portion of the actuator device in response to the one or more inputs, the actuator apparatus and the actuator device being coupled in series between a first structure and a second structure, with the first portion of the actuator apparatus and the first portion of the actuator device connected to each other to translate together as a unit along a support, wherein a position of the first structure relative to the second structure after the actuator apparatus and the actuator device have been actuated is at least approximately the same as a position of the first structure relative to the second structure before the actuator apparatus and the actuator device are actuated.

26. The method of claim 25, further comprising sensing a sensor position of an electro-mechanical sensor, the sensor position corresponding to at least one of a relative position between a first portion and a second portion of an actuator apparatus and a relative position between a first portion and a second portion of an actuator device, wherein the sensor position is different after the actuator apparatus and the actuator device have been actuated as compared to before the actuator apparatus and the actuator device are actuated.

27. The method of claim 25 wherein automatically sending one or more inputs from a controller to an actuator apparatus and an actuator device includes automatically sending one or more inputs from a controller to an actuator apparatus periodically at least approximately at a selected time interval.

28. The method of claim 25 wherein the position of the first structure relative to the second structure remains at least approximately unchanged while the actuator apparatus and the actuator device are actuated.

29. The method of claim 25, further comprising at least one of:
sensing a relative position between the first structure and the second structure;
sensing a relative position between the first portion and the second portion of the actuator apparatus; and
sensing a relative position between the first portion and the second portion of the actuator device.

30. The method of claim 25 wherein a method for positioning an actuator system includes a method for positioning an actuator system that is carried by an aerospace vehicle.

31. The method of claim 25 wherein actuating the actuator apparatus includes rotating the second portion of the actuator apparatus relative to the first portion of the actuator apparatus.

32. The method of claim 25 wherein actuating the actuator device and the actuator apparatus so that a position of the first structure relative to the second structure after the actuator apparatus and the actuator device have been actuated is at least approximately the same as a position of the first structure relative to the second structure before the actuator apparatus and the actuator device are actuated is performed as part of normal operation of the actuator system.

33. The method of claim 25, further comprising automatically actuating one of the actuator device and the actuator apparatus to move at least one of the first and second structures relative to the other, in response to an indication that the other of the actuator device and the actuator apparatus experiences a fault.

34. A method for positioning an actuator system, comprising:
sensing a sensor position of an electro-mechanical sensor, the sensor position corresponding to at least one of a relative position between a first portion and a second portion of an actuator apparatus and a relative position between a first portion and a second portion of an actuator device;
automatically sending one or more inputs from a controller to the actuator apparatus and the actuator device, the one or more inputs commanding the actuation of the actuator apparatus and the actuator device;
actuating the actuator apparatus to move the first portion of the actuator apparatus relative to the second portion of the actuator apparatus in response to the one or more inputs; and
actuating the actuator device to move the first portion of the actuator device relative to the second portion of the actuator device in response to the one or more inputs, the actuator apparatus and the actuator device being coupled in series between a first structure and a second structure, with the first portion of the actuator apparatus and the first portion of the actuator device connected to each other to translate together as a unit along a support, wherein a position of the first structure relative to the second structure after the actuator apparatus and the actuator device have been actuated is at least approximately the same as a position of the first structure relative to the second structure before the actuator apparatus and the actuator device are actuated, and wherein the sensor position is different after the actuator apparatus and the actuator device have been actuated as compared to before the actuator apparatus and the actuator device are actuated.

35. The method of claim 34 wherein automatically sending one or more inputs from a controller to an actuator apparatus and an actuator device includes automatically sending one or more inputs from a controller to an actuator apparatus periodically at least approximately at a selected time interval.

* * * * *